(12) United States Patent
Ohori (10) Patent No.: US 11,496,031 B2
(45) Date of Patent: Nov. 8, 2022

(54) MOTOR AND BRUSHLESS WIPER MOTOR

(71) Applicant: MITSUBA Corporation, Gunma (JP)

(72) Inventor: Ryo Ohori, Gunma (JP)

(73) Assignee: MITSUBA Corporation, Gunma (JP)

( * ) Notice: Subject to any disclaimer, the term of this patent is extended or adjusted under 35 U.S.C. 154(b) by 39 days.

(21) Appl. No.: 17/041,429

(22) PCT Filed: Mar. 22, 2019

(86) PCT No.: PCT/JP2019/012074
§ 371 (c)(1),
(2) Date: Sep. 24, 2020

(87) PCT Pub. No.: WO2019/198464
PCT Pub. Date: Oct. 17, 2019

(65) Prior Publication Data
US 2021/0021183 A1      Jan. 21, 2021

(30) Foreign Application Priority Data
Apr. 12, 2018 (JP) .............................. JP2018-076679

(51) Int. Cl.
*H02K 1/278* (2022.01)
*H02K 21/16* (2006.01)
(Continued)

(52) U.S. Cl.
CPC ............... *H02K 21/16* (2013.01); *B60S 1/08* (2013.01); *H02K 1/278* (2013.01); *H02K 7/1166* (2013.01); *H02K 29/03* (2013.01)

(58) Field of Classification Search
CPC ..... H02K 1/278; H02K 2213/06; H02K 29/03
See application file for complete search history.

(56) References Cited

U.S. PATENT DOCUMENTS 5,998,904 A    12/1999  Hattori
9,705,366 B2 *  7/2017  Tanaka ................... H02K 1/278
(Continued)

FOREIGN PATENT DOCUMENTS

CN    1725600    1/2006
CN    1747289    3/2006
(Continued)

OTHER PUBLICATIONS

"International Search Report (Form PCT/ISA/210) of PCT/JP2019/012074," dated Apr. 23, 2019, with English translation thereof, pp. 1-4.
(Continued)

*Primary Examiner* — Dang D Le
(74) *Attorney, Agent, or Firm* — JCIPRNET (57) ABSTRACT

The motor is provided with: a rotor core; permanent magnets disposed on the outer circumferential surface of the rotor core and magnetized in parallel orientation; and a salient pole saliently formed between the permanent magnets. The ratio of the number of magnetic poles of the permanent magnets to the number of teeth is 2:3. Sloped surfaces are formed on the side surfaces of the permanent magnets in the circumferential direction. The angle θ2 between lines L3 and lines L2 is an electrical angle of 13° or more, said lines L3 connecting outer circumferential corner portions where the sloped surfaces and the outer circumferential surface are connected to each other and the shaft center, said lines L2 connecting the radial direction outermost side of the circumferential side surface of the salient pole and the shaft center.

7 Claims, 8 Drawing Sheets

(51) Int. Cl.
*B60S 1/08* (2006.01)
*H02K 7/116* (2006.01)
*H02K 29/03* (2006.01)

(56) References Cited

U.S. PATENT DOCUMENTS

| | | | | |
|---|---|---|---|---|
| 10,644,552 B2 * | 5/2020 | Ohori | ............... | H02K 1/278 |
| 2016/0254713 A1 | 9/2016 | Yamaguchi et al. | | |

FOREIGN PATENT DOCUMENTS

| | | | | | |
|---|---|---|---|---|---|
| CN | 103532328 A | * | 1/2014 | ............. | H02K 1/274 |
| CN | 107276272 | | 10/2017 | | |
| CN | 107425685 A | | 12/2017 | | |
| DE | 102015119020 A1 | * | 5/2017 | | |
| EP | 2626977 A2 | * | 8/2013 | ........... | H02K 1/2766 |
| EP | 2626977 A2 | | 8/2013 | | |
| EP | 2830192 A2 | | 1/2015 | | |
| EP | 3051672 A | | 8/2016 | | |
| FR | 2873513 A1 | | 1/2006 | | |
| JP | 2002262533 A | | 9/2002 | | |
| JP | 2004048970 A | | 2/2004 | | |
| JP | 2004048970 A | * | 2/2004 | | |
| JP | 2005065417 A | | 3/2005 | | |
| JP | 2006081383 A | | 3/2006 | | |
| JP | 2008245406 A | | 10/2008 | | |
| JP | 2013066370 A | | 4/2013 | | |
| JP | 2015231254 A | | 12/2015 | | |
| JP | 2016175638 A | * | 10/2016 | ................ | B60S 1/08 |
| JP | 2016175638 A | | 10/2016 | | |
| WO | 2014167645 A | | 10/2014 | | |
| WO | WO-2014167645 A1 | * | 10/2014 | ............... | H02K 1/16 |
| WO | 2017002873 A1 | | 1/2017 | | |
| WO | WO-2017002873 A1 | * | 1/2017 | ........... | H02K 1/2773 |

OTHER PUBLICATIONS

"Written Opinion of the International Searching Authority (Form PCT/ISA/237) of PCT/JP2019/012074," dated Apr. 23, 2019, with English translation thereof, pp. 1-12.
Office Action of Japan Counterpart Application, with English translation thereof, dated Nov. 16, 2021, pp. 1-10.
"Search Report of Europe Counterpart Application", dated Nov. 29, 2021, pp. 1-9.
"Office Action of China Counterpart Application", dated Sep. 6, 2022, with English translation thereof, pp. 1-17.

* cited by examiner

MOTOR AND BRUSHLESS WIPER MOTOR

CROSS-REFERENCE TO RELATED APPLICATION

This application is a 371 application of the International PCT application serial no. PCT/JP2019/012074, filed on Mar. 22, 2019, which claims the priority benefits of Japan Patent Application No. 2018-076679, filed on Apr. 12, 2018. The entirety of each of the above-mentioned patent applications is hereby incorporated by reference herein and made a part of this specification.

BACKGROUND

Technical Field

The disclosure relates to a motor and a brushless wiper motor.

Description of Related Art

A brushless motor (also referred to hereinafter simply as a motor) includes a stator having teeth around which coils are wound, and a rotor rotatably provided inside the stator in a radial direction thereof. Slots are formed between the teeth that are adjacent to each other in a circumferential direction thereof. The coils are wound around each of the teeth through these slots.

An interlinking magnetic flux is formed in the stator by supplying electric power to the coil. The rotor has a shaft, a substantially cylindrical rotor core that is externally fitted and affixed to the shaft, and permanent magnets provided on the rotor core. For example, ferrite magnets are used as the permanent magnets. In addition, magnetic attractive and repulsive forces are generated between the interlinking magnetic flux formed in the stator and the permanent magnets provided in the rotor core, whereby the rotor continuously rotates.

Here, examples of a type based on disposition of permanent magnets on a rotor include a type in which permanent magnets are disposed on an outer circumferential surface of a rotor core (surface permanent magnet (SPM)). Various methods for achieving high torque with this SPM type rotor have been proposed.

For example, a rotor has been proposed in which, on an outer circumferential surface of a rotor core, salient poles that project outward in a radial direction thereof are provided between permanent magnets that are adjacent to each other in a circumferential direction thereof (see, for example, Patent Literature 1). By providing the salient poles, in the rotor core, a direction in which an interlinking magnetic flux (q axis magnetic flux) formed by coils of a stator easily flows and a direction in which the interlinking magnetic flux does not easily flow (d axis direction) are formed. As a result, a reluctance torque is generated in the rotor core, and this reluctance torque can also contribute to a rotation force of the rotor. Here, in the motor of Patent Literature 1, the ratio of the number of magnetic poles to the number of teeth (the number of slots) is 2:3.

REFERENCE LIST

Patent Literature

Patent Literature 1: Japanese Patent Laid-Open No. 2002-262533

SUMMARY

Technical Problem

However, in a motor in which a ratio of the number of magnetic poles to the number of teeth is 2:3, when the salient poles are provided as in the above-described conventional technique, the interlinking magnetic flux easily flows toward the salient poles, so there is a problem that a demagnetizing field of the permanent magnets is generated by the interlinking magnetic flux on the circumferential side surfaces (side surfaces on the salient pole side) of the permanent magnets.

Further, when a salient pole is provided on the rotor core, the magnetic flux resulting from the permanent magnets is also formed on the salient pole. Therefore, when the order of the cogging torque of the motor is normally determined by the least common multiple of "the number of magnetic poles of permanent magnets×the number of teeth (the number of slots)," there is a possibility that the order will be twice the least common multiple. As a result, there is a possibility that the rotor core may stop at the rotation angle where the permanent magnets are most easily demagnetized. If the rotor core stops at the rotation angle where the permanent magnets are most easily demagnetized, when the motor is to be started again, electric power larger than a predetermined amount is required.

Therefore, the disclosure provides a motor and a brushless wiper motor capable of preventing the rotor core from stopping at a rotation angle where the permanent magnets are most easily demagnetized when the ratio of the number of magnetic poles of the permanent magnets to the number of teeth is 2:3.

Solution to the Problem

In order to solve the above problems, a motor according to the disclosure includes: a stator which has an annular stator core and a plurality of teeth projecting inward from an inner circumferential surface of the stator core in a radial direction; coils which are wound around the teeth; a shaft which rotates on an inner side of the stator core in the radial direction; a rotor core which is affixed to the shaft with a rotation axis of the shaft as a center in the radial direction; a plurality of permanent magnets which are disposed on an outer circumferential surface of the rotor core and magnetized in parallel orientation; and a salient pole which is formed to project outward in the radial direction between the permanent magnets adjacent to each other in a circumferential direction of the outer circumferential surface of the rotor core and with which circumferential side surfaces of the permanent magnets are brought into contact, and a ratio of the number of magnetic poles of the permanent magnets to the number of the teeth is 2:3, inclined surfaces are formed on the circumferential side surfaces of the permanent magnets to gradually separate from the salient pole toward an outer circumferential surface of the permanent magnets on an outer side in the radial direction, and an angle between a line, which connects the rotation axis and a corner portion where the inclined surface and the outer circumferential surface are connected to each other, and a line, which connects the rotation axis and an outermost side in the radial direction of a circumferential side surface of the salient pole, is an electrical angle of 13° or more.

With this configuration, when the ratio of the number of magnetic poles of the permanent magnets to the number of the teeth is 2:3, it is possible to prevent the order of the cogging torque from increasing more than usual even in a motor having a salient pole. Therefore, it is possible to prevent the rotor core from stopping at a rotation angle where the permanent magnets are most easily demagnetized.

Moreover, since the permanent magnets have parallel orientation, cogging of the motor can be suppressed and a high magnetic flux density can be obtained.

In the motor according to the disclosure, the permanent magnets are ferrite magnets.

With this configuration, compared with, for example, a configuration which uses rare earth magnets, it is possible to inhibit an increase in cost accompanying an increase in magnet usage quantity even when a radial dimension of the permanent magnets is increased.

In the motor according to the disclosure, the inclined surfaces of the permanent magnets are parallel to lines connecting circumferential centers of the permanent magnets and the rotation axis.

With this configuration, manufacturing of the permanent magnets can be facilitated, and the cost of the permanent magnets can be reduced. Further, since both circumferential side surfaces of the permanent magnets are parallel, both circumferential side surfaces of the salient pole are also parallel. For this reason, for example, saturation of the magnetic flux flowing through the salient pole can be inhibited as compared with the case in which the salient pole is trapezoidal when viewed in the direction of the rotation axis.

In the motor according to the disclosure, a circumferential width dimension of an end portion of the salient pole on the outer side in the radial direction is 40° or less in electrical angle.

In this way, by setting the electrical angle of the salient pole to 40° or less and reducing the circumferential width dimension of the salient pole in the circumferential direction, the inductance value in the direction of the q axis can be reduced, and the demagnetizing field can be inhibited.

In the motor according to the disclosure, a circumferential width dimension of an end portion of the salient pole on the outer side in the radial direction is 20° or more in electrical angle.

With this configuration, by securing the circumferential width dimension of the salient pole at 20° or more in electrical angle and thereby concentrating the magnetic flux into the salient pole, an effect of making the demagnetizing field difficult to act on the end portions of the permanent magnets can be surely obtained. Further, by setting the electrical angle of the salient pole to 20° or more and 40° or less, a high reluctance torque can be obtained.

In the motor according to the disclosure, one groove portion is formed on an end surface of the salient pole on the outer side in the radial direction along the direction of the rotation axis, and the groove portion is formed such that a circumferential groove width thereof becomes gradually narrower toward the inner side in the radial direction.

With this configuration, since the groove portion is provided on the end surface of the salient pole on the outer side in the radial direction, when the entire end surface of the salient pole on the outer side in the radial direction is viewed, an interval between the end surface and the teeth can be formed to be uneven. As a result, it is possible to inhibit a sudden change in the magnetic flux density generated in the teeth before and after the salient pole passes through between the teeth during rotation of the rotor core. For this reason, sudden torque fluctuations of the rotor core can be reduced, and torque ripple can be reduced.

A brushless wiper motor according to the disclosure includes the above-described motor.

With this configuration, a brushless wiper motor capable of preventing a rotor core from stopping at a rotation angle where permanent magnets are most easily demagnetized when the ratio of the number of magnetic poles of the permanent magnets to the number of teeth is 2:3 can be provided.

Effects

According to the disclosure, in a case where the ratio of the number of magnetic poles of the permanent magnets to the number of the teeth is 2:3, it is possible to prevent the order of the cogging torque from increasing more than usual even in a motor having a salient pole. Therefore, it is possible to prevent the rotor core from stopping at a rotation angle where the permanent magnets are most easily demagnetized.

DESCRIPTION OF THE EMBODIMENTS

Next, an embodiment of the disclosure will be described with reference to the drawings.

(Wiper Motor)

Figure 1:
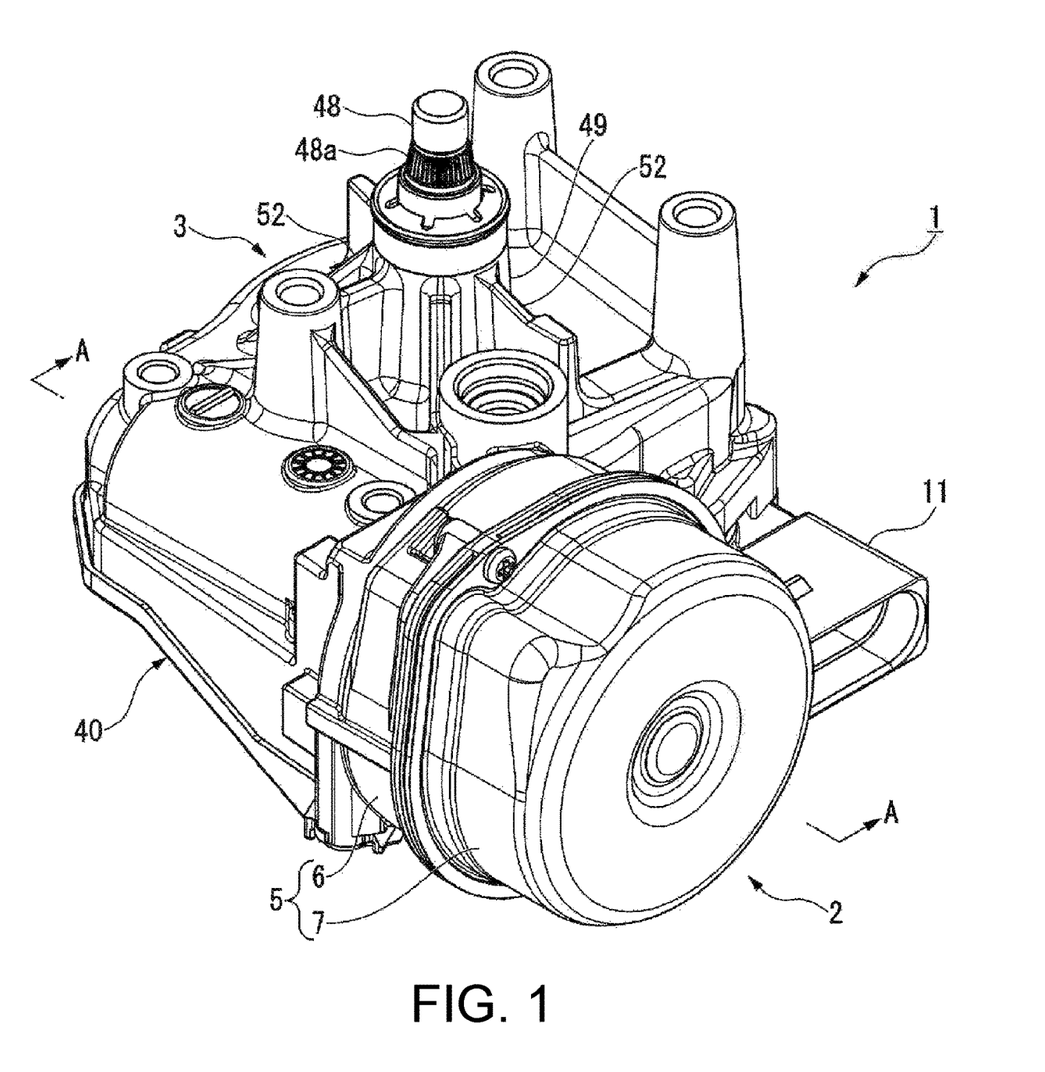
FIG. 1 is a perspective view of a wiper motor according to an embodiment of the disclosure.
Figure 2:
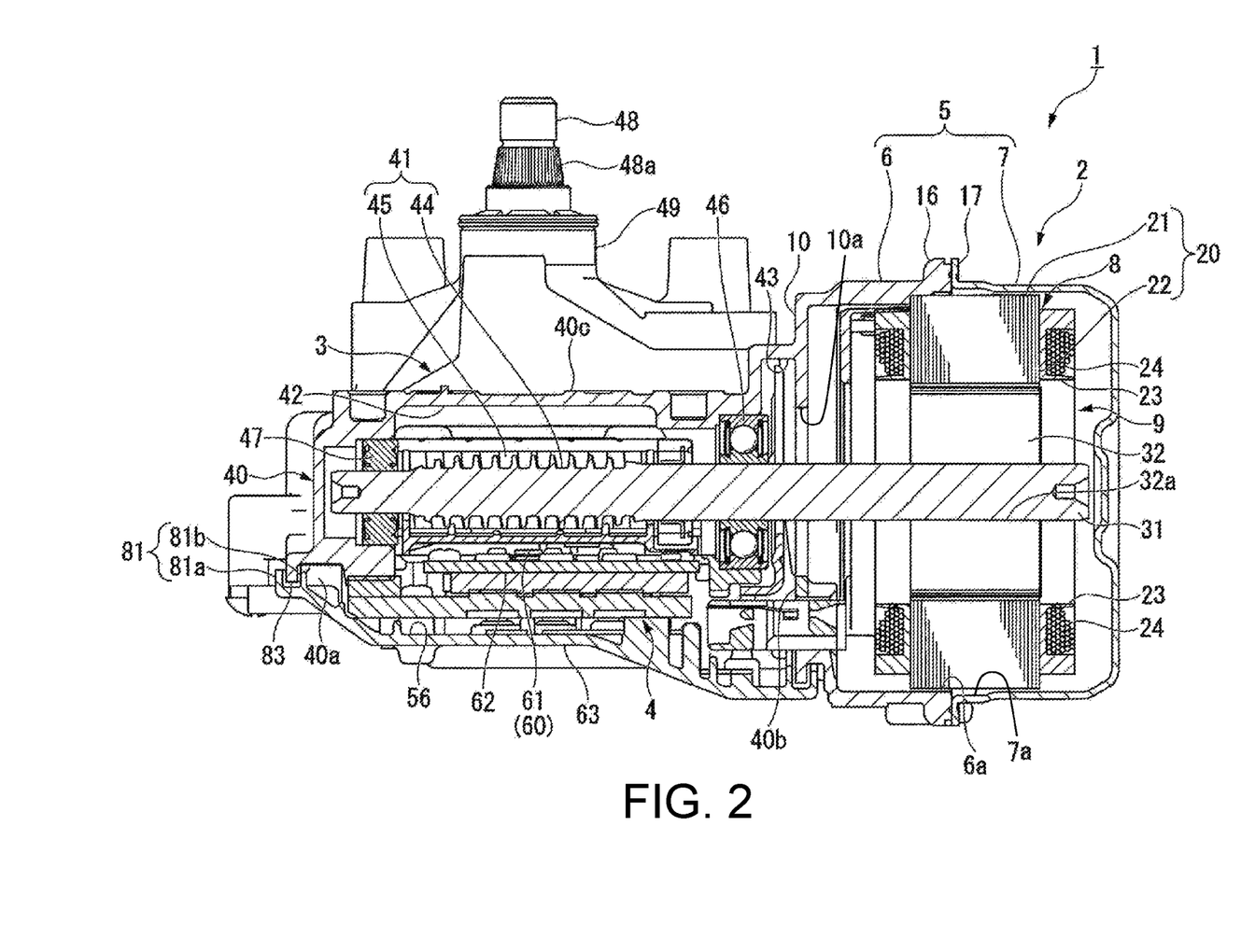
FIG. 2 is a cross-sectional view along line A-A in FIG. 1

FIG. 1 is a perspective view of a wiper motor 1. FIG. 2 is a cross-sectional view along line A-A in FIG. 1.

As shown in FIGS. 1 and 2, the wiper motor 1 serves as a drive source of a wiper mounted on a vehicle, for example. The wiper motor 1 includes a motor unit 2, a reduction gear unit 3 that decelerates and outputs rotation of the motor unit 2, and a controller unit 4 that controls driving of the motor unit 2.

Also, in the following description, the simple description of the "axial direction" refers to a direction of a rotation axis of a shaft 31 of the motor unit 2; the simple description of the "circumferential direction" refers to a circumferential direction of the shaft 31; and the simple description of the "radial direction" refers to a radial direction of the shaft 31.

(Motor Unit)

The motor unit 2 includes a motor case 5, a substantially cylindrical stator 8 accommodated in the motor case 5, and a rotor 9 which is provided on the inner side of the stator 8 in the radial direction and is provided to be rotatable with respect to the stator 8. The motor unit 2 is a what is called a brushless motor that does not require a brush at the time of supplying electric power to the stator 8.

(Motor Case)

The motor case 5 is formed of a material having excellent heat dissipation, such as aluminum die cast. The motor case 5 includes a first motor case 6 and a second motor case 7 which are configured to be separable from each other in the axial direction. The first motor case 6 and the second motor case 7 are each formed in a bottomed tubular shape.

The first motor case 6 is formed integrally with a gear case 40 of the reduction gear unit 3 such that a bottom portion 10 thereof is joined to the gear case 40. A through hole 10a into which the shaft 31 of the rotor 9 can be inserted is formed at substantially the center of the bottom portion 10 in the radial direction.

Further, an outer flange portion 16 that projects outward in the radial direction is formed in an opening portion 6a of the first motor case 6, and an outer flange portion 17 that projects outward in the radial direction is formed in an opening portion 7a of the second motor case 7. These outer flange portions 16 and 17 engage with each other to form the motor case 5 having an internal space. In addition, the stator 8 is disposed in the internal space of the motor case 5 to be fitted into the first motor case 6 and the second motor case 7.

(Stator)

Figure 3:
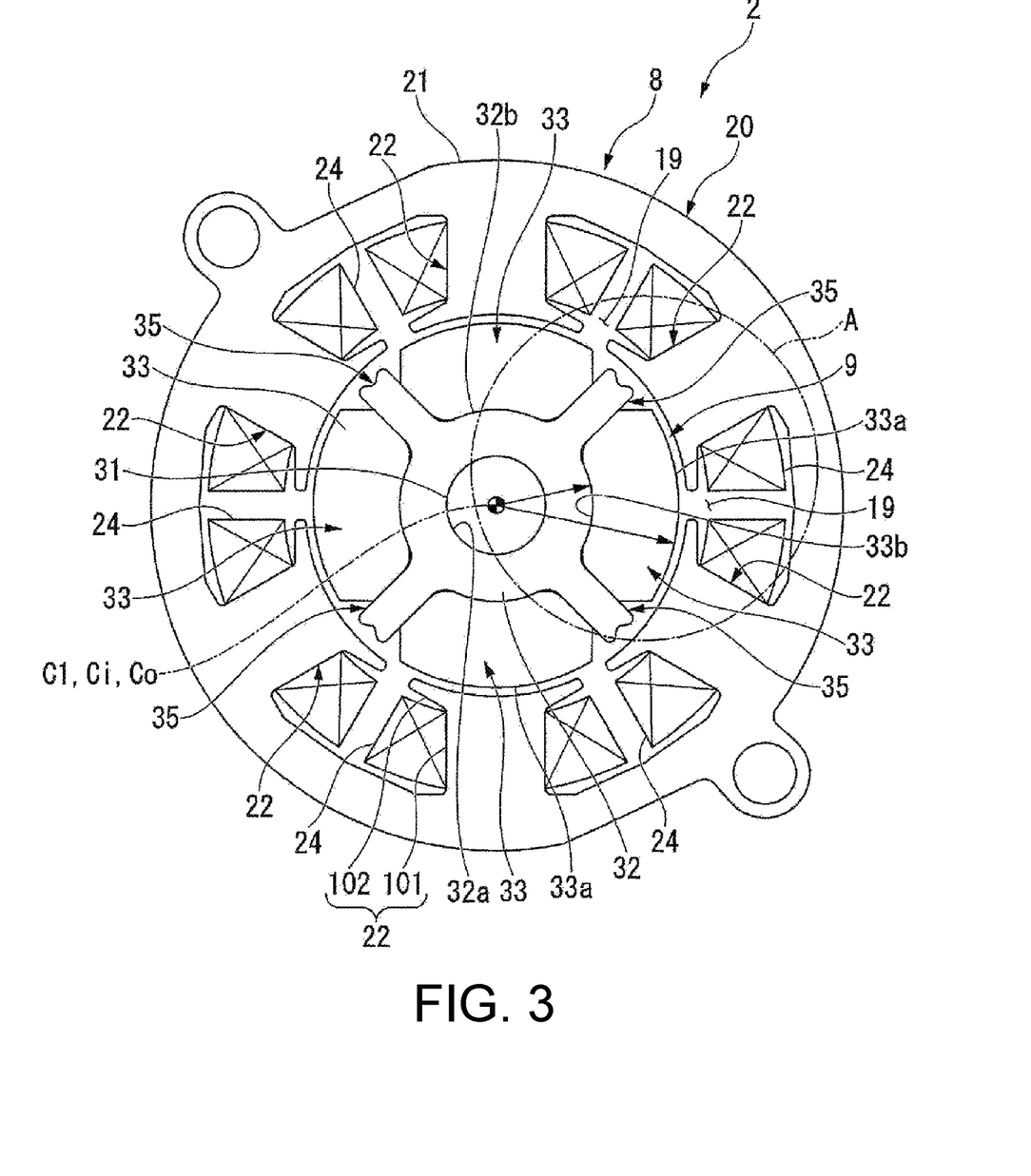
FIG. 3 is a configuration diagram of a stator and a rotor in the embodiment of the disclosure.

FIG. 3 shows a configuration of the stator 8 and the rotor 9, and corresponds to a diagram viewed in the axial direction.

As shown in FIGS. 2 and 3, the stator 8 has a stator core 20 in which a tubular core portion 21 having a substantially circular cross-sectional shape in the radial direction and a plurality of (for example, six in the present embodiment) teeth 22 projecting inward from the core portion 21 in the radial direction are formed integrally with each other.

The stator core 20 is formed by stacking a plurality of metal sheets in the axial direction. Further, the stator core 20 is not limited to the case of being formed by stacking a plurality of metal sheets in the axial direction, and may be formed by press-molding soft magnetic powder, for example.

Each of the teeth 22 is formed by integrally molding a tooth body 101 that projects from an inner circumferential surface of the core portion 21 in the radial direction, and collar portions 102 that extend from a radial-direction inner end of the tooth body 101 in the circumferential direction. The collar portions 102 are formed to extend from the tooth body 101 to both sides in the circumferential direction. In addition, slots 19 are formed between the collar portions 102 that are adjacent to each other in the circumferential direction.

Also, the inner circumferential surface of the core portion 21 and the teeth 22 are covered with an insulator 23 made of a resin. Coils 24 are wound around each of the teeth 22 from above the insulator 23. Each coil 24 generates a magnetic field for rotating the rotor 9 when electric power is supplied from the controller unit 4.

(Rotor)

Figure 4:
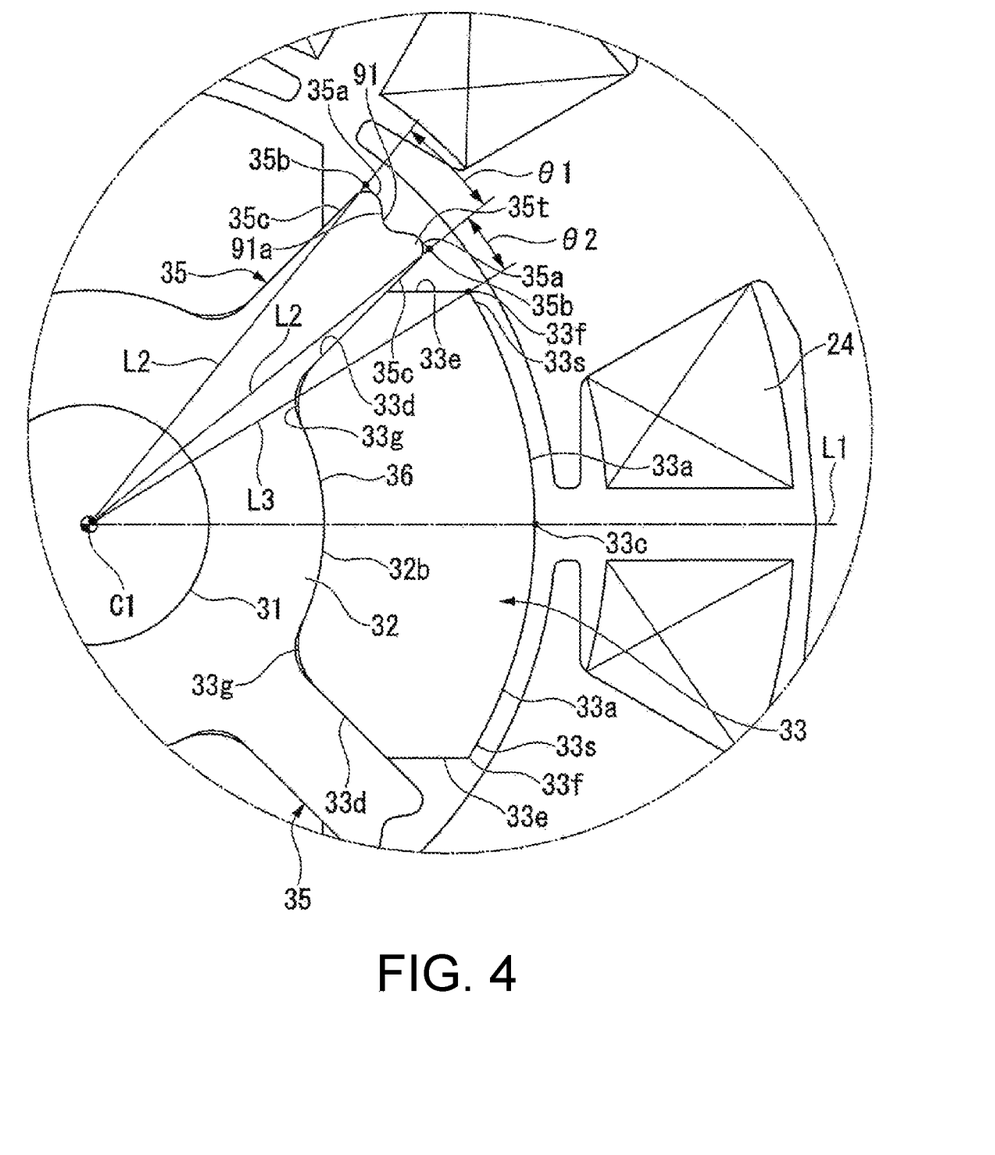
FIG. 4 is an enlarged view of part A in FIG. 3.

FIG. 4 is an enlarged view of part A in FIG. 3.

As shown in FIGS. 3 and 4, the rotor 9 is rotatably provided on the inner side of the stator 8 in the radial direction with a minute gap therebetween. The rotor 9 includes the shaft 31 integrally formed with a worm shaft 44 (see FIG. 2) that configures the reduction gear unit 3, a substantially column-shaped rotor core 32 that is externally fitted and affixed to the shaft 31 with the shaft 31 as a shaft center (rotation axis) C1, and four permanent magnets 33 provided on an outer circumferential surface 32b of the rotor core 32. Ferrite magnets are preferably used as the permanent magnets 33.

In this way, in the motor unit 2, the ratio of the number of magnetic poles of the permanent magnets 33 to the number of the slots 19 (teeth 22) is 2:3.

The rotor core 32 is formed by stacking a plurality of metal sheets in the axial direction. Further, the rotor core 32 is not limited to the case of being formed by stacking a plurality of metal sheets in the axial direction, and may be formed by press-molding soft magnetic powder, for example.

In addition, a through hole 32a penetrating in the axial direction is formed substantially in the center of the rotor core 32 in the radial direction. The shaft 31 is press-fitted into the through hole 32a. The shaft 31 may be inserted into the through hole 32a, and the rotor core 32 may be externally fitted and affixed to the shaft 31 using an adhesive or the like.

Further, four salient poles 35 are provided on the outer circumferential surface 32b of the rotor core 32 at equal intervals in the circumferential direction. The salient pole 35 is formed to project outward in the radial direction and fully extends in the axial direction of the rotor core 32. Round chamfered portions 35a are formed on the outer side of the salient pole 35 in the radial direction and at corner portions on both sides in the circumferential direction.

Further, a circumferential width dimension of the salient pole 35 at a radial-direction outer end portion 35t is 20° or more and 40° or less in the electrical angle θ1. Also, the circumferential width dimension of the radial-direction outer end portion 35t of the salient pole 35 is a width dimension between both circumferential-direction corner portions 35b (hereinafter referred to as radial-direction corner portions 35b of the salient pole 35) when round chamfered portions 35a are not formed on the salient pole 35. In the following description, the circumferential width dimension of the radial-direction outer end portion 35t of the salient pole 35 will be simply referred to as the circumferential width dimension of the salient pole 35.

Also, the salient pole 35 is formed such that both side surfaces 35c facing each other in the circumferential direction are parallel to each other. That is, the salient pole 35 is formed such that the circumferential width dimension is uniform in the radial direction.

Further, in the radial-direction outer end portion 35t of the salient pole 35, one groove portion 91 is formed at substantially the center in the circumferential direction over the entire axial direction. The groove portion 91 is formed in substantially a V groove shape such that a circumferential groove width thereof becomes gradually narrower toward the inner side in the radial direction (that is, toward a bottom portion 91a thereof).

The outer circumferential surface 32b of the rotor core 32 formed in this manner is configured such that intervals between two salient poles 35 adjacent to each other in the circumferential direction serve as magnet housing portions 36. The permanent magnets 33 are disposed in each of the magnet housing portions 36, and are affixed to the rotor core 32 with, for example, an adhesive or the like.

In the permanent magnet 33, an arc center Co of an outer circumferential surface 33a thereof on an outer side in the radial direction and an arc center Ci of an inner circumferential surface 33b thereof on an inner side in the radial direction coincide with a position of the shaft center C1 of the shaft 31. Further, a diameter of a circle passing through the end portion 35t of the salient pole 35 and a diameter of the outer circumferential surface 33a of the permanent magnet 33 are the same.

The entire inner circumferential surface 33b of the permanent magnet 33 is in contact with the outer circumferential surface 32b of the rotor core 32. Further, both circumferential side surfaces of the permanent magnet 33 are formed by a salient pole contact surface 33d that is positioned on the inner side in the radial direction and is brought into contact with the side surface 35c of the salient pole 35 and a sloped surface 33e that is positioned further outward in the radial direction than the salient pole contact surface 33d, which are smoothly connected to each other. The salient pole contact surface 33d is smoothly connected to the inner circumferential surface 33b via an arcuate surface 33g.

The sloped surface 33e is formed to be oblique and flat such that it gradually separates from the salient pole 35 from a radial-direction outer end of the salient pole contact surface 33d toward the outer circumferential surface 33a of the permanent magnet 33. In one permanent magnet 33, the sloped surfaces 33e on both sides in the circumferential direction are parallel to a line L1 connecting a circumferential intermediate portion 33c of the permanent magnet 33 and the shaft center C1 of the shaft 31. For this reason, the two sloped surfaces 33e are also parallel to each other.

Further, an angle θ2 between a line L2 and a line L3 is an electrical angle of 13° or more, said line L2 connecting the radial-direction corner portion 35b of the salient pole 35 and the shaft center C1 of the shaft 31, said line L3 connecting an outer circumferential corner portion 33f, where the sloped surface 33e and the outer circumferential surface 33a of the permanent magnet 33 are connected to each other, and the shaft center C1 of the shaft 31. Further, in the following description, this angle θ2 will be referred to as the electrical angle θ2 of the sloped surface 33e.

Further, the permanent magnet 33 is magnetized such that an orientation of magnetization (magnetic field) becomes parallel orientation along a thickness direction thereof. The permanent magnets 33 are disposed such that magnetic poles thereof differ from each other in the circumferential direction. For this reason, the salient poles 35 of the rotor core 32 are positioned between the permanent magnets 33 adjacent to each other in the circumferential direction, that is, at boundaries (pole boundaries) of the magnetic poles.

(Reduction Gear Unit)

Returning to FIGS. 1 and 2, the reduction gear unit 3 includes the gear case 40 to which the motor case 5 is attached, and a worm reduction gear mechanism 41 accommodated in the gear case 40. The gear case 40 is formed of a material having excellent heat dissipation, such as aluminum die cast. The gear case 40 is formed in a box shape having an opening portion 40a on one surface thereof and has a gear accommodating portion 42 which accommodates the worm reduction gear mechanism 41 therein. Further, an opening 43 that provides communication between the through hole 10a of the first motor case 6 and the gear accommodating portion 42 is formed in a side wall 40b of the gear case 40 at a place at which the first motor case 6 is formed integrally therewith.

Also, a bottom wall 40c of the gear case 40 is provided with a substantially cylindrical bearing boss 49. The bearing boss 49 is for rotatably supporting an output shaft 48 of the worm reduction gear mechanism 41 and has a slide bearing (not shown) provided on an inner circumferential surface thereof. Further, an O-ring (not shown) is attached to an inner circumferential edge of a tip of the bearing boss 49. This prevents dust and water from entering to the inside from the outside through the bearing boss 49. In addition, a plurality of ribs 52 are provided on an outer circumferential surface of the bearing boss 49. This ensures rigidity of the bearing boss 49.

The worm reduction gear mechanism 41 accommodated in the gear accommodating portion 42 is configured of the worm shaft 44 and a worm wheel 45 that engages with the worm shaft 44. The worm shaft 44 is disposed coaxially with the shaft 31 of the motor unit 2. In addition, both ends of the worm shaft 44 are rotatably supported by bearings 46 and 47 provided on the gear case 40. An end portion of the worm shaft 44 on the motor unit 2 side projects to reach the opening 43 of the gear case 40 via the bearings 46. This projecting end portion of the worm shaft 44 and an end portion of the shaft 31 of the motor unit 2 are joined together, and the worm shaft 44 and the shaft 31 are integrated with each other. Also, the worm shaft 44 and the shaft 31 may be formed integrally with each other by molding a worm shaft portion and a shaft portion with one base material.

The worm wheel 45 engaged with the worm shaft 44 is provided with the output shaft 48 at a radial center of the worm wheel 45. The output shaft 48 is disposed coaxially with a direction of a rotation axis of the worm wheel 45 and projects outside the gear case 40 via the bearing boss 49 of the gear case 40. A spline 48a that can be connected to an electric component (not shown) is formed at a projecting tip of the output shaft 48.

Further, a sensor magnet (not shown) is provided at the radial center of the worm wheel 45 on a side opposite to a side on which the output shaft 48 projects. The sensor magnet configures one part of a rotational position detection unit 60 that detect a rotational position of the worm wheel 45. A magnetic detection element 61, which configures the other part of the rotational position detection unit 60, is provided in the controller unit 4 which is disposed to face the worm wheel 45 on the sensor magnet side of the worm wheel 45 (on the opening portion 40a side of the gear case 40).

(Controller Unit)

The controller unit 4 that controls driving of the motor unit 2 includes a controller board 62 on which the magnetic detection element 61 is mounted, and a cover 63 provided to close the opening portion 40a of the gear case 40. In addition, the controller board 62 is disposed to face the sensor magnet side of the worm wheel 45 (the opening portion 40a side of the gear case 40).

The controller board 62 is a board obtained by forming a plurality of conductive patterns (not shown) on a what is called an epoxy board. Terminal portions of the coils 24 pulled out from the stator core 20 of the motor unit 2 are connected to the controller board 62, and terminals (not shown) of a connector 11 provided on the cover 63 are electrically connected to the controller board 62. Also, in addition to the magnetic detection element 61, a power module (not shown) including a switching element such as a field effect transistor (FET) that controls a current supplied to the coils 24 is mounted on the controller board 62.

Further, a capacitor (not shown) that smoothes a voltage applied to the controller board 62 and the like are mounted on the controller board 62.

The cover 63 that covers the controller board 62 configured as described above is made of a resin. Also, the cover 63 is formed to project slightly outward. In addition, an inner surface side of the cover 63 serves as a controller accommodating portion 56 that accommodates the controller board 62 and the like.

Moreover, the connector 11 is formed integrally on an outer circumferential portion of the cover 63. The connector 11 is formed such that it can be fitted and attached to a connector extending from an external power supply (not shown). In addition, the controller board 62 is electrically connected to the terminals of the connector 11. As a result, electric power from the external power supply is supplied to the controller board 62.

Further, a fitting portion 81 that is fitted to an end portion of the side wall 40b of the gear case 40 is formed to project at an opening edge of the cover 63. The fitting portion 81 is configured of two walls 81a and 81b along the opening edge of the cover 63. In addition, the end portion of the side wall 40b of the gear case 40 is inserted (fitted) between these two walls 81a and 81b. Thus, a labyrinth portion 83 is formed between the gear case 40 and the cover 63. The labyrinth portion 83 prevents dust and water from entering through between the gear case 40 and the cover 63. Also, fixation of the gear case 40 and the cover 63 is performed by fastening bolts (not shown).

(Operation of Wiper Motor)

Next, an operation of the wiper motor 1 will be described.

In the wiper motor 1, the electric power supplied to the controller board 62 via the connector 11 is selectively supplied to each of the coils 24 of the motor unit 2 via the power module (not shown). Then, a predetermined interlinking magnetic flux is formed in the stator 8 (teeth 22), and a magnetic attractive or repulsive force is generated between the interlinking magnetic flux and effective magnetic fluxes formed by the permanent magnets 33 of the rotor 9. As a result, the rotor 9 continuously rotates.

When the rotor 9 rotates, the worm shaft 44 integrated with the shaft 31 rotates, and the worm wheel 45 engaged with the worm shaft 44 also rotates. Then, the output shaft 48 connected to the worm wheel 45 rotates, and a desired electric component (for example, a wiper driving device mounted on a vehicle) is driven.

Further, detection results on the rotational position of the worm wheel 45 detected by the magnetic detection element 61 mounted on the controller board 62 are output as signals to an external device (not shown). A switching timing of the switching element and the like of the power module (not shown) is controlled by the external device (not shown) on the basis of rotational position detection signals of the worm wheel 45 and thus control for driving the motor unit 2 is performed. Also, control for outputting driving signals of the power module and driving the motor unit 2 may be performed by the controller unit 4.

(Operations and Effects of Rotor)

Next, operations and effects of the rotor 9 will be described.

Here, the rotor 9 is a what is called a surface permanent magnet (SPM) type rotor in which the permanent magnets 33 are disposed on the outer circumferential surface 32b of the rotor core 32. For this reason, an inductance value in the direction of the d axis can be reduced. In addition to this, in the rotor 9, the salient poles 35 are provided between the permanent magnets 33 that are adjacent to each other in the circumferential direction. As a result, an inductance value in the direction of the q axis resulting from the interlinking magnetic flux of the stator 8 can be increased as compared with a case of not including the salient poles 35. Therefore, the rotor 9 is rotated by also utilizing a difference in reluctance torque between the direction of the d axis and the direction of the q axis.

As described above, by providing the salient poles 35, the reluctance torque can contribute to the rotational torque of the rotor 9, so that the interlinking magnetic flux of the stator 8 easily passes through both circumferential side surfaces of the permanent magnets 33 in contact with the salient poles 35. Therefore, a demagnetizing field of the permanent magnets 33 resulting from the interlinking magnetic flux is generated on both circumferential side surfaces of the permanent magnets 33.

Further, by providing the salient poles 35, the magnetic fluxes of the permanent magnets 33 also flow through the salient poles 35. For this reason, there is a possibility that the order of the cogging torque of the motor unit 2 may increase more than the number of magnetic poles of the rotor 9 (four poles in this embodiment) due to the magnetic fluxes formed on the salient poles 35. However, in the embodiment, in the motor unit 2 in which the ratio of the number of magnetic poles of the permanent magnets 33 to the number of the slots 19 (teeth 22) is 2:3, the sloped surfaces 33e are formed on both sides in the circumferential direction of the permanent magnets 33. Therefore, the electrical angle $\theta 2$ of the sloped surface 33e is set to 13° or more. Therefore, even when the salient poles 35 are provided, it is possible to suppress an increase in the order of the cogging torque. Hereinafter, a specific description will be given based on FIG. 5.

Figure 5:
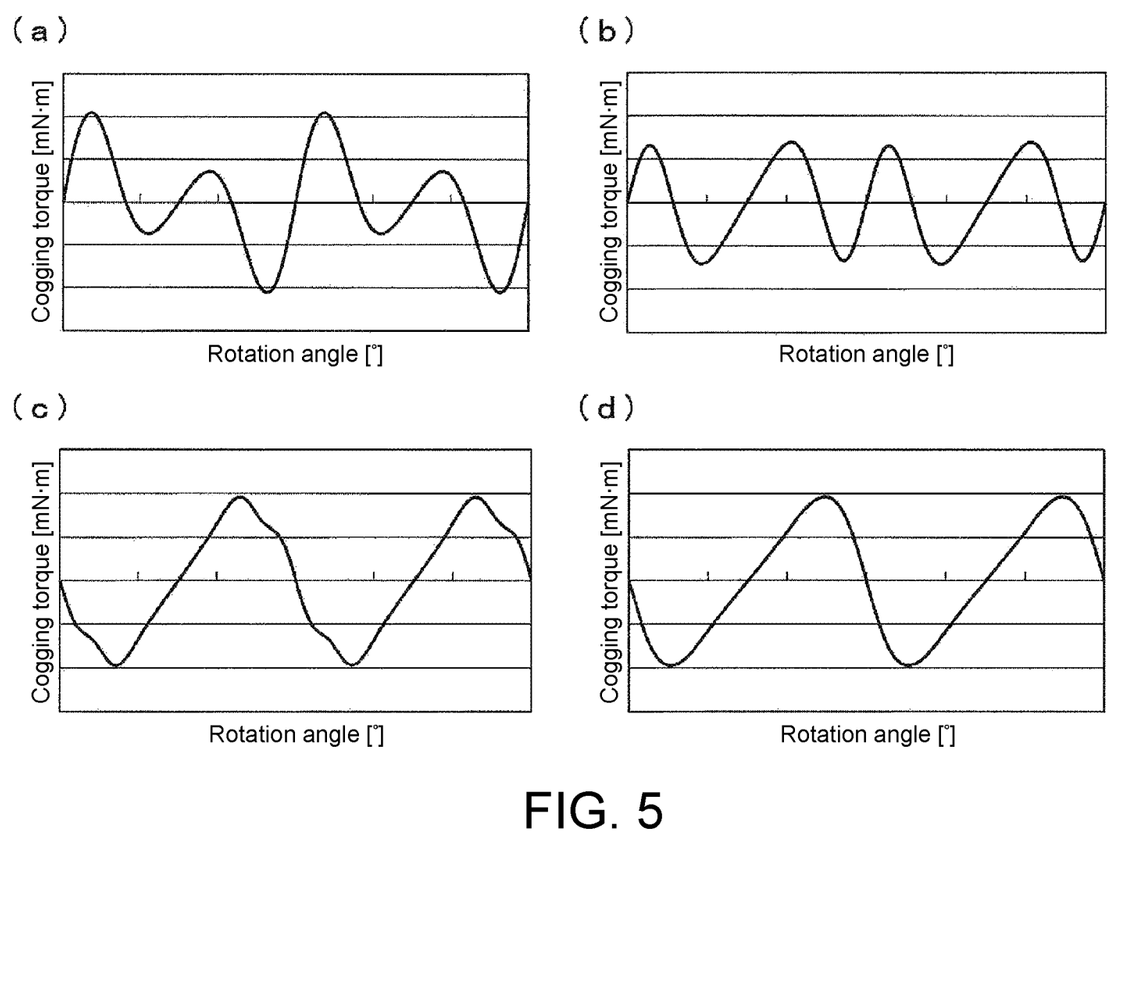
FIG. 5 is a graph showing changes in cogging torque in the embodiment of the disclosure, in which (a) to (d) change the electrical angle of the sloped surface formed on the permanent magnets.

FIG. 5 is a graph showing changes in the cogging torque in which the vertical axis represents the cogging torque [mN·m] of the rotor 9 and the horizontal axis represents the rotation angle of the rotor 9, and (a) shows the case where the electrical angle $\theta 2$ of the sloped surface 33e of the permanent magnet 33 is 5°, and (b) shows the case where the electrical angle $\theta 2$ of the sloped surface 33e of the permanent magnet 33 is 10°, and (c) shows the case where the electrical angle $\theta 2$ of the sloped surface 33e of the permanent magnet 33 is 13°, and (d) shows the case where the electrical angle $\theta 2$ of the sloped surface 33e of the permanent magnet 33 is 15°. Further, in the waveforms shown in FIG. 5, the number of peaks is the order of the cogging torque.

That is, in the case where the electrical angle $\theta 2$ of the sloped surface 33e is 5° as shown in (a) of FIG. 5 and the case where the electrical angle $\theta 2$ of the sloped surface 33e is 10° as shown in (b) of FIG. 5, it can be confirmed that the order of the cogging torque is eight, which is greater than the number of magnetic poles of the rotor 9 (four poles).

On the other hand, in the case where the electrical angle $\theta 2$ of the sloped surface 33e is 13° or more as shown in (c) and (d) of FIG. 5, it can be confirmed that the order of the cogging torque (being four) is equal to the number of magnetic poles of the rotor 9 (four poles).

Therefore, in the motor unit 2 in which the ratio of the number of magnetic poles of the permanent magnets 33 to the number of the slots 19 (teeth 22) is 2:3 and which has the salient poles 35, by setting the electrical angle $\theta 2$ of the sloped surface 33e of the permanent magnet 33 to 13° or more, it is possible to prevent the order of the cogging torque from increasing more than the number of magnetic poles of the rotor 9. Therefore, it is possible to prevent the rotor core 32 from stopping at the rotation angle where the permanent magnets 33 are most easily demagnetized. Moreover, since the magnetizing directions of the permanent magnets 33 are parallel orientation, cogging of the motor unit 2 can be suppressed and a high magnetic flux density can be obtained.

Also, the groove portion 91 is formed at the end portion 35t of the salient pole 35 of the rotor 9. Thus, when the entire end portion 35t of the salient pole 35 is viewed, an interval between the end portion 35t and each of the teeth 22 (collar portions 102) of the stator 8 can be formed to be uneven. That is, the interval between the end portion 35t of the salient pole 35 and each of the teeth 22 becomes larger at a place at which the groove portion 91 is formed, but becomes smaller at a place at which the groove portion 91 is not formed. As a result, it is possible to inhibit a sudden increase in the magnetic flux density generated in the teeth 22 (collar portions 102) before and after the salient poles 35 pass through between the teeth 22 during rotation of the rotor 9.

Also, the salient pole 35 of the rotor core 32 is formed such that the circumferential width dimension becomes 20° or more and 40° or less in the electrical angle θ1. In this way, by setting the circumferential width dimension of the salient pole 35 at 40° or less in the electrical angle θ1, the inductance value in the direction of the q axis can be reduced. This makes it possible to inhibit the demagnetizing field and obtain a high reluctance torque. Hereinafter, it will be described more specifically.

Figure 6:
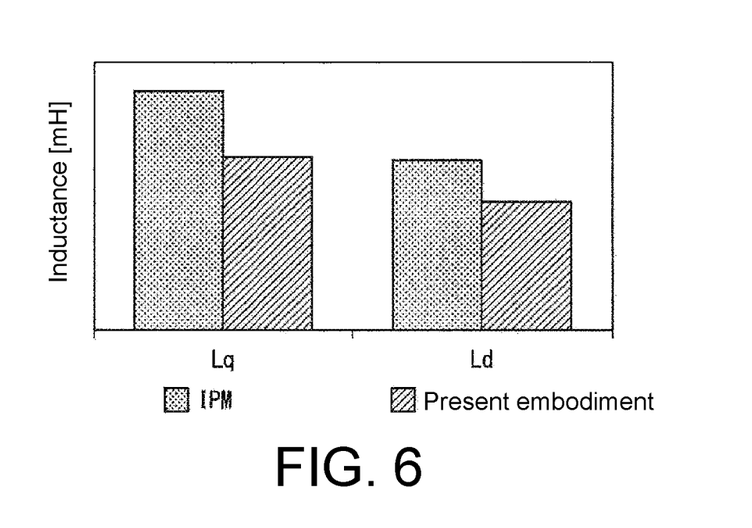
FIG. 6 is a graph showing q axis and d axis inductance of the rotor according to the embodiment of the disclosure, which is compared with a rotor having a conventional structure.

FIG. 6 is a graph showing q axis and d axis inductances Lq and Ld [mH] of the rotor 9, in which the rotor 9 of the present embodiment is compared with a rotor having a conventional structure. Also, the conventional structure mentioned here is a structure of a rotor of a what is called an interior permanent magnet (IPM) type motor in which permanent magnets are disposed in a plurality of slits formed in a rotor core.

As shown in the figure, it can be confirmed that the rotor 9 of the present embodiment has smaller inductance values on both the q axis and the d axis as compared with the conventional structure.

Figure 7:
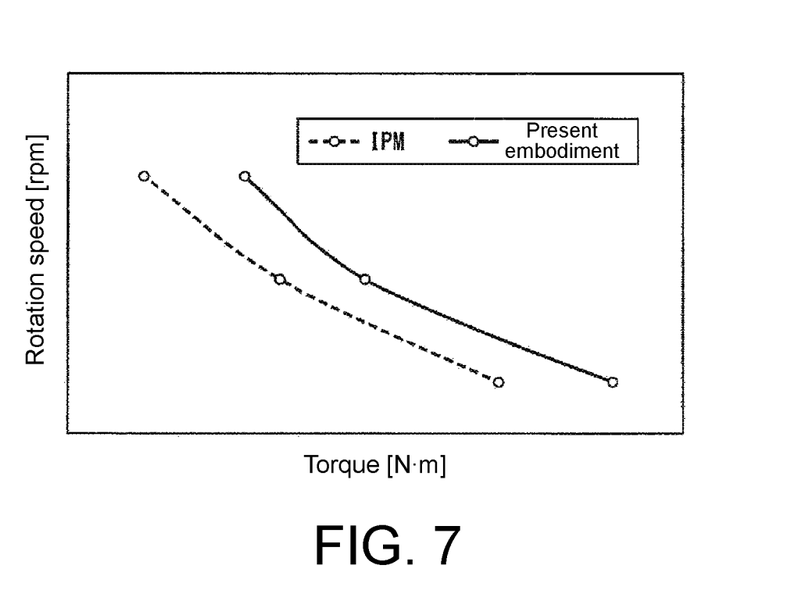
FIG. 7 is a graph showing a change in rotation speed of the rotor according to the embodiment of the disclosure, which is compared with a rotor having a conventional IPM structure.

FIG. 7 is a graph showing a change in rotation speed of the rotor 9 in which the vertical axis represents the rotation speed [rpm] of the rotor 9 and the horizontal axis represents the torque [N·m] of the rotor 9. More specifically, FIG. 7 is a graph showing a correlation between the torque [N·m] and the rotation speed [rpm] in a case in which advance angle energization and wide angle energization are performed on the rotor 9, in which the rotor 9 of the present embodiment is compared with the conventional rotor having an IPM structure.

As shown in the figure, it can be confirmed that the rotor 9 of the present embodiment generates a higher torque and a higher rotation speed than those of the conventional structure.

Figure 8:
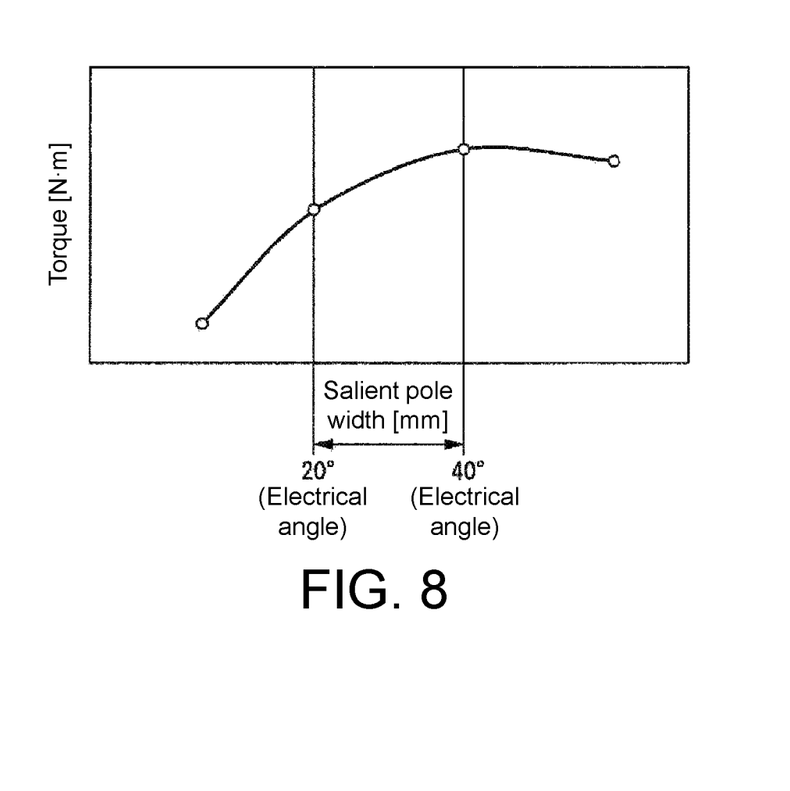
FIG. 8 is a graph showing a change in torque of the rotor for each salient pole width of the salient poles in the embodiment of the disclosure.

FIG. 8 is a graph showing a change in torque of the rotor 9 in which the vertical axis represents the torque [N·m] of the rotor 9 and the horizontal axis represents the salient pole width [mm] of the salient pole 35 provided on the rotor core 32. More specifically, FIG. 8 is a graph showing the torque generated in the rotor 9 of the present embodiment in a case in which the circumferential width dimension (electrical angle θ1) of the salient pole 35 varies.

Figure 9:
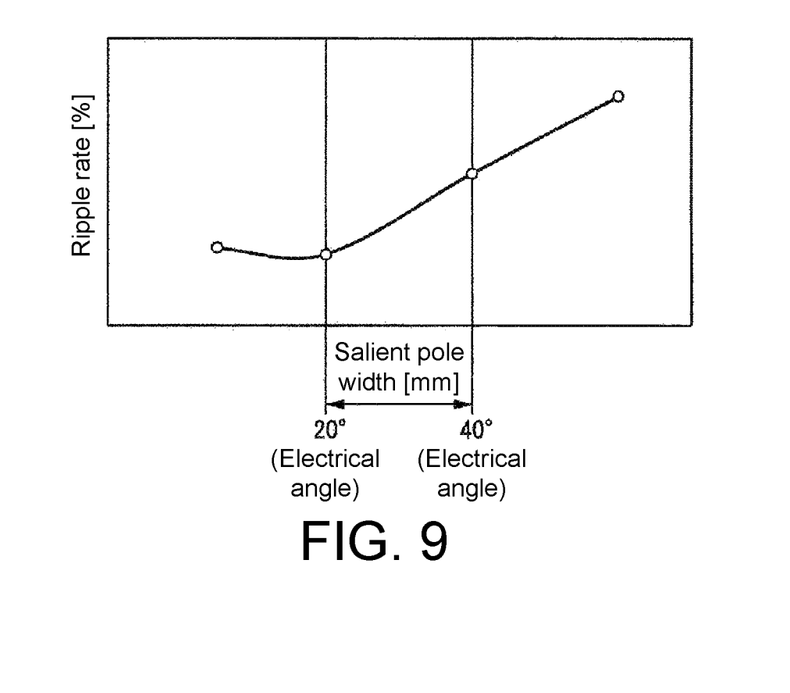
FIG. 9 is a graph showing a change in ripple rate of the rotor for each salient pole width of the salient poles in the embodiment of the disclosure.

FIG. 9 is a graph showing a change in ripple rate of the rotor 9 in which the vertical axis represents the ripple rate [%] of the rotor 9 and the horizontal axis represents the salient pole width [mm] of the salient pole 35 of the rotor core 32. More specifically, FIG. 9 is a graph showing the ripple rate generated in the rotor 9 of the present embodiment in a case in which the circumferential width dimension of the salient pole 35 varies.

Figure 10:
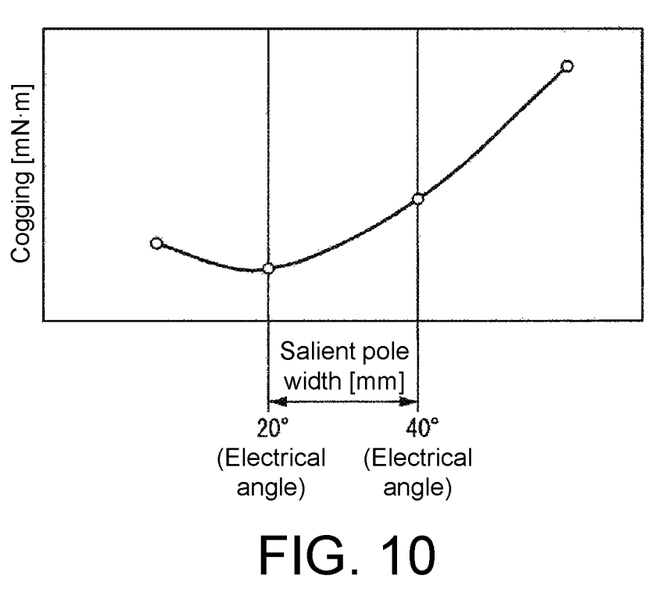
FIG. 10 is a graph showing a change in cogging of the rotor for each salient pole width of the salient poles in the embodiment of the disclosure.

FIG. 10 is a graph showing a change in cogging of the rotor 9 in which the vertical axis represents the cogging [mN·m] of the rotor 9 and the horizontal axis represents the salient pole width [mm] of the salient pole 35 of the rotor core 32. More specifically, FIG. 10 is a graph showing the cogging generated in the rotor 9 of the present embodiment in a case in which the circumferential width dimension of the salient pole 35 varies.

As shown in FIGS. 8 to 10, in the rotor 9 of the present embodiment, a high reluctance torque can be obtained when the circumferential width dimension of the salient pole 35 is 3 mm (electrical angle θ1=20°) to 5 mm (electrical angle θ1=40°). Further, it can be confirmed that the ripple rate and the cogging torque of the motor unit 2 can be inhibited.

In this way, by setting the electrical angle θ1 of the salient pole 35 to 40° or less and reducing the circumferential width dimension of the salient pole 35 in the circumferential direction, the inductance value in the direction of the q axis can be reduced, and the demagnetizing field can be inhibited. In addition, by setting the electrical angle θ1 of the salient pole 35 to 20° or more to secure the circumferential width dimension at a certain value or more and thereby concentrating the magnetic flux into the salient pole 35, an effect of making the demagnetizing field difficult to act on an end portion 33s of the permanent magnet 33 can be surely obtained. Further, by setting the electrical angle θ1 of the salient pole 35 to 20° or more and 40° or less, a high reluctance torque can be obtained.

Further, by using ferrite magnets instead of rare earth magnets as the permanent magnets 33 in the rotor 9, it is possible to inhibit an increase in cost accompanying an increase in magnet usage quantity even when a radial dimension of the permanent magnets 33 is increased.

Further, in one permanent magnet 33, the sloped surfaces 33e on both sides in the circumferential direction are parallel to the line L1 connecting the circumferential intermediate portion 33c of the permanent magnet 33 and the shaft center C1 of the shaft 31. For this reason, the two sloped surfaces 33e are also parallel to each other. With this configuration, manufacturing of the permanent magnet 33 can be facilitated, and the cost of the permanent magnet 33 can be reduced. More specifically, the permanent magnet 33 can be formed from a material having two parallel sloped surfaces 33e as two sides facing each other, and thus manufacturing cost of the permanent magnet 33 can be reduced.

Also, the salient pole 35 is formed such that both side surfaces 35c facing each other in the circumferential direction are parallel to each other. That is, the salient pole 35 is formed such that the circumferential width dimension is uniform in the radial direction. For this reason, for example, saturation of the magnetic flux flowing through the salient pole 35 can be inhibited as compared with the case in which the salient pole 35 is trapezoidal when viewed in the direction of the rotation axis.

Further, the disclosure is not limited to the embodiment described above, and includes various modifications of the embodiment described above without departing from the spirit of the disclosure.

For example, although the wiper motor 1 is exemplified as an example of the motor in the embodiment described above, the motor according to the disclosure is not limited to the wiper motor 1 and can be used as a drive source for an electric component (for example, a power window, a sunroof, an electric seat, or the like) mounted on a vehicle and various other purposes.

Also, in the embodiment described above, the case in which one groove portion 91 is formed at substantially the circumferential center of the radial-direction outer end portion 35t of the salient pole 35 over the entire length in the axial direction has been described. However, the disclosure is not limited thereto, and two or more groove portions 91 may be formed in the end portion 35t of the salient pole 35.

In addition, the case in which the groove portion 91 is formed in substantially a V groove shape such that the circumferential groove width thereof becomes gradually narrower toward the inner side in the radial direction has been described. However, the disclosure is not limited thereto, and the groove portion 91 may be allowed as long as the circumferential groove width thereof is formed to be gradually narrower toward the inner side in the radial direction, and the groove portion 91 may be formed in substantially a U shape, for example.

Also, the case in which the sloped surface 33e formed on the permanent magnet 33 is formed to be oblique and flat such that it gradually separates from the salient pole 35 from the radial-direction outer end of the salient pole contact surface 33d toward the outer circumferential surface 33a of the permanent magnet 33 has been described. However, the sloped surface 33e may be allowed as long as it is formed to gradually separate from the salient pole 35 from the radial-direction outer end of the salient pole contact surface 33d toward the outer circumferential surface 33a of the permanent magnet 33. For example, the sloped surface 33e may be formed in a curved shape.

What is claimed is:

1. A motor comprising:
a stator which comprises an annular stator core and a plurality of teeth projecting inward from an inner circumferential surface of the stator core in a radial direction;
coils which are wound around the teeth;
a shaft which rotates on an inner side of the stator core in the radial direction;
a rotor core which is affixed to the shaft with a rotation axis of the shaft as a center in the radial direction;
a plurality of permanent magnets which are disposed on an outer circumferential surface of the rotor core and magnetized in parallel orientation; and
a salient pole which is formed to project outward in the radial direction between the permanent magnets adjacent to each other in a circumferential direction of the outer circumferential surface of the rotor core and with which circumferential side surfaces of the permanent magnets are brought into contact,
wherein a ratio of the number of magnetic poles of the permanent magnets to the number of the teeth is 2:3,
inclined surfaces are formed on the circumferential side surfaces of the permanent magnets to gradually separate from the salient pole toward an outer circumferential surface of the permanent magnets on an outer side in the radial direction, and
an angle between a line, which connects the rotation axis and a corner portion where the inclined surface and the outer circumferential surface are connected to each other, and a line, which connects the rotation axis and an outermost side in the radial direction of a circumferential side surface of the salient pole, is an electrical angle of 13° or more.

2. The motor according to claim 1, wherein the permanent magnets are ferrite magnets.

3. The motor according to claim 1, wherein the inclined surfaces of the permanent magnets are parallel to lines connecting circumferential centers of the permanent magnets and the rotation axis.

4. The motor according to claim 1, wherein a circumferential width dimension of an end portion of the salient pole on the outer side in the radial direction is 40° or less in electrical angle.

5. The motor according to claim 1, wherein a circumferential width dimension of an end portion of the salient pole on the outer side in the radial direction is 20° or more in electrical angle.

6. The motor according to claim 1,
wherein one groove portion is formed on an end surface of the salient pole on the outer side in the radial direction along the direction of the rotation axis, and
the groove portion is formed such that a circumferential groove width thereof becomes gradually narrower toward the inner side in the radial direction.

7. A brushless wiper motor comprising the motor according to claim 1.

* * * * *